United States Patent
Masamura et al.

(10) Patent No.: US 7,628,376 B2
(45) Date of Patent: Dec. 8, 2009

(54) DIAPHRAGM VALVE

(75) Inventors: Akinori Masamura, Komaki (JP); Toshiyuki Nagao, Komaki (JP); Hiroki Iwata, Komaki (JP)

(73) Assignee: CDK Corporation, Komaki (JP)

( * ) Notice: Subject to any disclaimer, the term of this patent is extended or adjusted under 35 U.S.C. 154(b) by 74 days.

(21) Appl. No.: 11/665,975

(22) PCT Filed: Nov. 21, 2005

(86) PCT No.: PCT/JP2005/021343

§ 371 (c)(1),
(2), (4) Date: Apr. 23, 2007

(87) PCT Pub. No.: WO2006/061986

PCT Pub. Date: Jun. 15, 2006

(65) Prior Publication Data
US 2008/0116412 A1 May 22, 2008

(30) Foreign Application Priority Data
Dec. 10, 2004 (JP) .............................. 2004-358675

(51) Int. Cl.
F16K 31/126 (2006.01)
(52) U.S. Cl. ..................... 251/63.6; 251/331; 251/335.2
(58) Field of Classification Search ................ 251/331, 251/335.2, 63.5, 63.6
See application file for complete search history.

(56) References Cited
U.S. PATENT DOCUMENTS
2,855,176 A * 10/1958 Boteler ........................ 251/331

| | | | |
|---|---|---|---|
| 3,151,838 A * | 10/1964 | Tripoli et al. ................ 251/331 |
| 3,429,552 A * | 2/1969 | Erickson et al. ........ 251/129.17 |
| 4,534,537 A | 8/1985 | Zukausky |
| 4,720,076 A * | 1/1988 | Hyde ....................... 251/335.2 |
| 4,819,691 A * | 4/1989 | Lofgren et al. ............... 251/331 |
| 4,826,132 A * | 5/1989 | Moldenhauer ........... 251/129.17 |
| 4,872,638 A * | 10/1989 | Thompson et al. .......... 251/331 |
| 5,004,011 A * | 4/1991 | Linder et al. .............. 251/335.2 |
| 5,178,366 A * | 1/1993 | Kojima et al. ............. 251/335.2 |
| 6,000,416 A | 12/1999 | Kingsford et al. |
| 6,056,003 A * | 5/2000 | Madsen et al. ............ 251/335.2 |
| 6,086,039 A | 7/2000 | Sievers et al. |
| 2004/0036045 A1* | 2/2004 | Weingarten .................. 251/61.5 |
| 2004/0046137 A1* | 3/2004 | Herbert et al. .......... 251/129.17 |
| 2005/0006617 A1* | 1/2005 | Leys ........................ 251/335.2 |

FOREIGN PATENT DOCUMENTS

| JP | A 09-217845 | 8/1997 |
|---|---|---|
| JP | A 11-037329 | 2/1999 |
| JP | A 11-051218 | 2/1999 |
| JP | A 2001-173811 | 6/2001 |

* cited by examiner

Primary Examiner—John Bastianelli
(74) Attorney, Agent, or Firm—Oliff & Berridge, PLC

(57) ABSTRACT

A diaphragm valve having a diaphragm valve element including a valve element body movable into contact with a valve seat, a web portion extending outward from the valve element body, and a fixed portion formed at an outer peripheral edge of the web portion. The web portion includes a vertical portion vertically formed continuous with the valve element body, a horizontal portion horizontally formed continuous with the fixed portion, and a connecting portion of a circular arc shape (an upward protruding shape) in section to connect the vertical portion with the horizontal portion, thereby holding the vertical portion in constant contact with an outer surface of a backup.

9 Claims, 3 Drawing Sheets

DIAPHRAGM VALVE

TECHNICAL FIELD

The present invention relates to a diaphragm valve for controlling the supply of fluid by bringing a diaphragm into or out of contact with a valve seat. In more detail, the present invention relates to a diaphragm valve including a diaphragm with improved durability and, particularly, to a suitable one for controlling supply of high-pressure fluid.

BACKGROUND ART

A chemical liquid valve for controlling a chemical liquid for a semiconductor manufacturing apparatus heretofore uses such a diaphragm valve as shown in FIG. 3, for example. This diaphragm valve 100 has a body 110 formed therein with a first flow passage 111 and a second flow passage 112 which have lateral ports and open in an upper surface of the body 110. The second flow passage 112 communicates with a valve port 114 formed in a valve seat 113. The first flow passage 111 communicates with a region surrounding the valve seat 113. On the upper surface of the body 110 in which one end of each of the first flow passage 111 and the second flow passage 112 opens, a diaphragm valve element 115 is placed. A peripheral portion of the diaphragm valve element 115 is anchored to define an airtight space around the openings of the first and second flow passages 111 and 112.

The diaphragm valve element 115 includes a valve element body 117 which can come into or out of contact with the valve seat 113 and a web (or diaphragm) portion 118 extending from a side surface of the valve element body 117. An annular fixed portion 119 formed at a peripheral edge of the web portion 118 is anchored between the body 110 and a cylinder 120. In the cylinder 120, a piston rod 121 is placed slidably in a vertical direction and is coupled at its lower end to the valve element body 117 of the diaphragm valve element 115. A cover 122 is attached to an upper portion of the cylinder 120, and a spring 123 is mounted in the cover 122 to urge the piston rod 121 downward. The cylinder 120 is further formed with an operation port 125 through which air is supplied to pressurize the piston rod 121 against the urging force of the spring 123.

In this diaphragm valve 100, therefore, the piston rod 121 is constantly urged downward by the spring 123, thereby pressing the valve element body 117 of the diaphragm valve element 115 against the valve seat 113 to close the valve. As compressed air is supplied through the operation port 125 of the cylinder 120, the piston rod 121 is pressurized from below to move upward against the urging force of the spring 123. Accordingly, the valve element body 117 coupled to the lower end of the piston rod 121 is also moved upward away from the valve seat 113, permitting communication between the first path 111 and the second path 112, so that the valve is placed in an open state. When the supplied compressed air is discharged through the operation port 125, the piston rod 121 urged by the spring 123 is moved downward, and the valve is returned to a closed state again as shown in the figure.

However, the above diaphragm valve has a problem in durability because, when the diaphragm is bent, stress may concentrate on the web portion of the diaphragm, especially, a root portion of the web portion continuous with the valve element body. In other words, a boundary portion between the web portion and the valve element body tends to be deteriorated, which is problematic. To avoid such a problem, various measures for the diaphragm valve have been taken to prevent the stress concentration on the web portion of the diaphragm, especially, the root portion of the web portion continuous with the valve element body.

As one of the diaphragm valves having adopted such measures, for example, there is a diaphragm valve disclosed in JP-A-9-217845. This disclosed diaphragm valve comprises a diaphragm including a central valve element, an annular thin web portion integrally formed around the valve element, and a cylindrical holding part integrally formed around the annular thin web portion. The annular thin web portion is formed in an upwardly curved shape in section with an inner peripheral root portion nearly vertically continuous with an upper surface of the valve element and an outer peripheral root portion nearly vertically continuous with an upper edge of an inner surface of the cylindrical holding part.

During valve opening/closing operations, the above configuration of the diaphragm valve permits only the curved portion of the annular thin web portion to be elastically deformed and keeps the inner and outer root portions in a nearly vertical form to prevent the inner and outer root portions from becoming subject to the bending stress, thus achieving improved durability of the diaphragm.

[Patent Document 1] JP-A-9-217845

DISCLOSURE OF INVENTION

Problems to be Solved by the Invention

However, the aforementioned diaphragm valve has a problem in controlling the supply of high-pressure fluid (500 kPa or more). Specifically, the stress is likely to concentrate on the boundary (the root portion) between the valve element body and the web portion, leading to rapid deterioration. This is because such fluid pressure causes deformation of the web portion (the annular thin web portion) and then the boundary (the root portion) between the valve element body and the web portion could not be kept in the nearly vertical form, thus resulting in stress concentration on the boundary (the root portion) between the valve element body and the web portion. As above, the aforementioned diaphragm valve could not have durability performance needed to control the supply of the high-pressure fluid, and therefore could not control the supply of the high-pressure fluid.

Correspondingly, for instance, some semiconductor manufacturing factories using the diaphragm valves have been built in high-rise construction, in which chemical solutions or liquids stored in a place corresponding to a first floor have to be supplied to another place corresponding to any of upper floors. In the diaphragm valve used as such a chemical liquid supply valve, a diaphragm will be subject to high pressure (e.g., about 700 kPa). However, the existing diaphragm valves as mentioned above lack necessary durability performance for the diaphragm and consequently could not be used as the aforementioned chemical liquid supply valve.

The present invention has been made to solve the above problems and has a purpose to provide a diaphragm valve capable of preventing stress concentration on or around a boundary between a valve element body and a web portion of a diaphragm to improve durability of the diaphragm.

Means for Solving the Problems

To solve the above problems, a diaphragm valve according to the present invention is arranged such that a valve seat is formed at a boundary between a first flow passage and a second flow passage formed in a body, a diaphragm coupled to a driving shaft of an actuator can be brought into/out of contact with the valve seat to close/open between the first flow passage and the second flow passage, wherein the diaphragm includes a valve element body movable into contact with the valve seat, a web portion extending outward from the valve element body, and a fixed portion formed at a peripheral edge of the web portion, the web portion includes a vertical portion vertically formed continuous with the valve element body and a connecting portion that connects the vertical portion with the fixed portion, and the vertical portion is constantly in contact with the driving shaft.

The diaphragm of the above diaphragm valve includes the valve element body movable into contact with the valve seat, the web portion extending outward from the valve element body, and the fixed portion formed at the peripheral edge of the web portion, the web portion includes the vertical portion vertically formed continuous with the valve element body and the connecting portion that connects the vertical portion with the fixed portion. During the valve opening/closing operation, accordingly, the web portion of the diaphragm will be bent by elastically deforming only the connecting portion and hardly deforming the vertical portion to bring the valve element body of the diaphragm into/out of contact with the valve seat. This diaphragm valve can to reliably prevent the vertical portion, especially, the boundary between the vertical portion and the valve element body from becoming subject to stress concentration.

In this diaphragm valve, further, the vertical portion is constantly in contact with the driving shaft of the actuator. Accordingly, even when high-pressure fluid is supplied to this diaphragm valve, the vertical portion is supported by the driving shaft and thus will not be deformed. No stress therefore will concentrate on the boundary between the vertical portion and the valve element body. According to this diaphragm valve, consequently, it is possible to prevent stress concentration on or around the boundary between the vertical portion and the valve element body to improve the durability of the diaphragm even in controlling the supply of the high-pressure fluid.

To solve the above problems, the diaphragm in another aspect of the present invention is arranged such that a valve seat is formed at a boundary between a first flow passage and a second flow passage formed in a body, a diaphragm coupled to a driving shaft of an actuator can be brought into/out of contact with the valve seat to close/open between the first flow passage and the second flow passage, wherein the diaphragm includes a valve element body movable into contact with the valve seat, a web portion extending outward from the valve element body, and a fixed portion formed at a peripheral edge of the web portion, and the web portion includes a vertical portion vertically formed continuous with the valve element body, a horizontal portion horizontally formed continuous with the fixed portion, and a connecting portion that connects the vertical portion with the fixed portion.

In this diaphragm valve, the diaphragm includes the valve element body movable into contact with the valve seat, the web portion extending outward from the valve element body, and the fixed portion formed at the peripheral edge of the web portion, and the web portion includes a vertical portion vertically formed continuous with the valve element body, the horizontal portion horizontally formed continuous with the fixed portion, and the connecting portion of a circular arc shape in section to connect the vertical portion with the fixed portion. During the valve opening/closing operation, accordingly, the web portion of the diaphragm will be bent by elastically deforming only the connecting portion and hardly deforming the vertical portion to bring the valve element body of the diaphragm into/out of contact with the valve seat. This diaphragm valve can to reliably prevent the vertical portion, especially, the boundary between the vertical portion and the valve element body from becoming subject to stress concentration.

In this diaphragm valve, further, the horizontal portion is provided around the web portion and therefore the vertical portion receives a force in the inward direction of the diaphragm. Accordingly, the vertical portion is constantly in contact with the driving shaft without expanding in an outward direction of the diaphragm. In this diaphragm valve, further, the vertical portion is constantly in contact with the driving shaft of the actuator. Accordingly, even when high-pressure fluid is supplied to this diaphragm valve, the vertical portion is supported by the driving shaft and thus will not be deformed. No stress therefore will concentrate on the boundary between the vertical portion and the valve element body. According to this diaphragm valve, consequently, it is possible to prevent stress concentration on or around the boundary between the vertical portion and the valve element body to improve the durability of the diaphragm even in controlling the supply of the high-pressure fluid.

In the aforementioned diaphragm valve, preferably, the diaphragm is configured such that the boundary between the valve element body and the web portion is located within a diameter of the valve seat.

The web thickness of the diaphragm has to be large (about twice as thick as that of a conventional one) in order to control the supply of the high-pressure fluid. However, if the shape of the conventional product remains unchanged and the web thickness is merely increased, the diaphragm valve cannot be operated properly. The diaphragm designed to have the above shape can provide a longer length of the web portion of the diaphragm, which allowing the web portion even having increased web thickness to be deformed smoothly. Consequently, the diaphragm even when designed to have increased web thickness can be operated properly.

In the aforementioned diaphragm valve, preferably, the driving shaft is provided at its end with a backup coupled with the diaphragm so as to be in contact with the vertical portion and the connecting portion to support the web portion.

Accordingly, the web portion of the diaphragm is constantly supported by the backup which operates together with the diaphragm irrespective of the position of the diaphragm. In other words, even in either case; the valve closed state or the valve open state, the web portion of the diaphragm is supported by the backup. This can prevent the web portion of the diaphragm from becoming excessively deformed, even during use of the high-pressure fluid. That is, the durability of the diaphragm can be enhanced.

[Effects of the Invention]

According to the diaphragm valve of the present invention, the vertical portion of the diaphragm is constantly in contact with the driving shaft of the actuator, so that the vertical portion is supported by the driving shaft and thus will not be deformed even during supply of the high-pressure fluid. No stress will therefore concentrate on the boundary between the vertical portion and the valve element body. According to this diaphragm valve, consequently, it is possible to prevent stress concentration on or around the boundary between the vertical portion and the valve element body to improve the durability of the diaphragm even in controlling the supply of the high-pressure fluid.

EXPLANATION OF REFERENCE CODES

Figure 1:
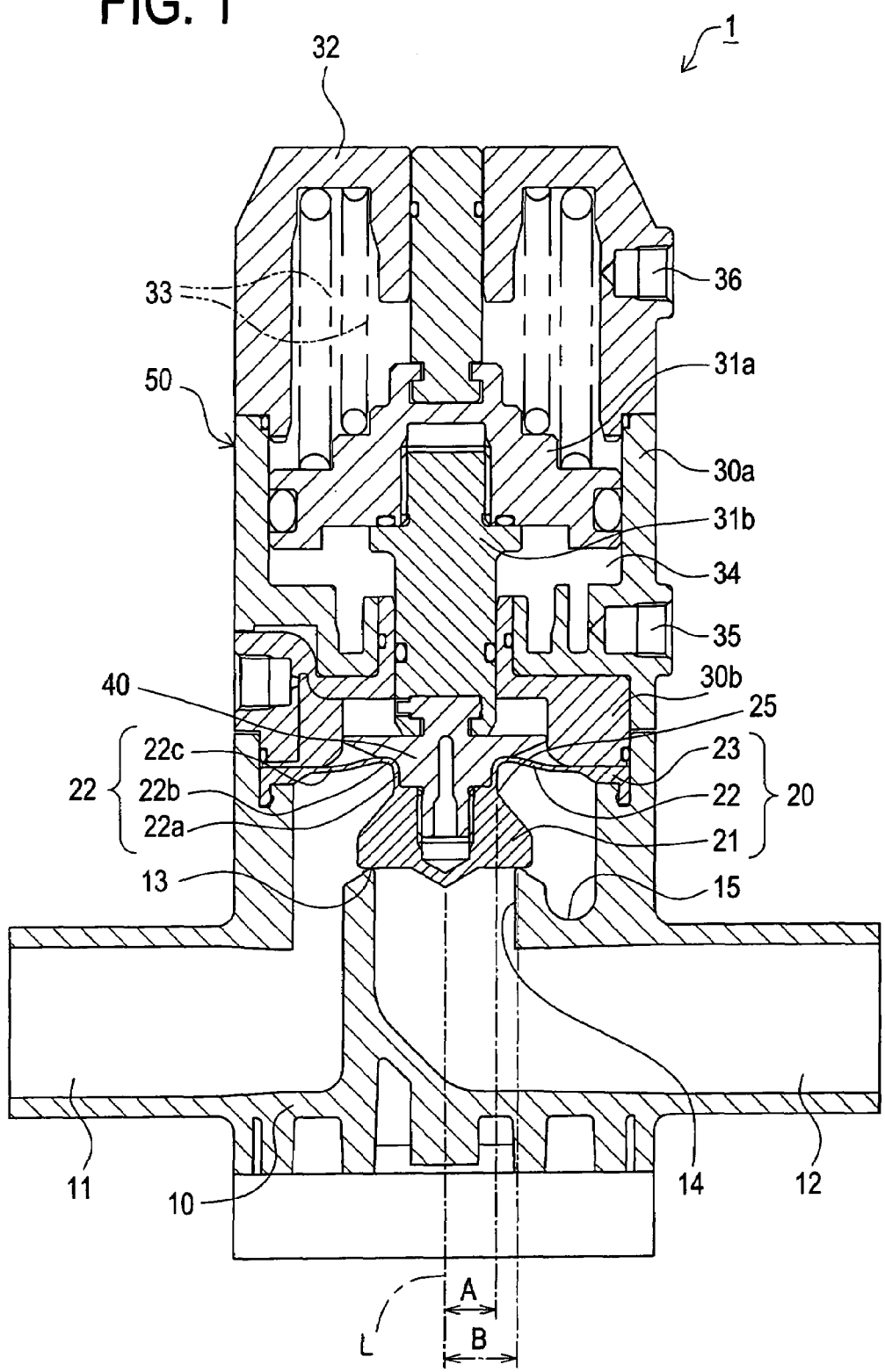
FIG. 1 is a sectional view of a diaphragm valve, showing a valve open state.

1 Diaphragm valve
10 Body
13 Valve seat
20 Diaphragm valve element
21 Valve element body
22 Web portion
22a Vertical portion
22b Connecting portion
22c Horizontal portion
23 Fixed portion
31b Rod
40 Backup
50 Actuator

BEST MODE FOR CARRYING OUT THE INVENTION

Figure 2:
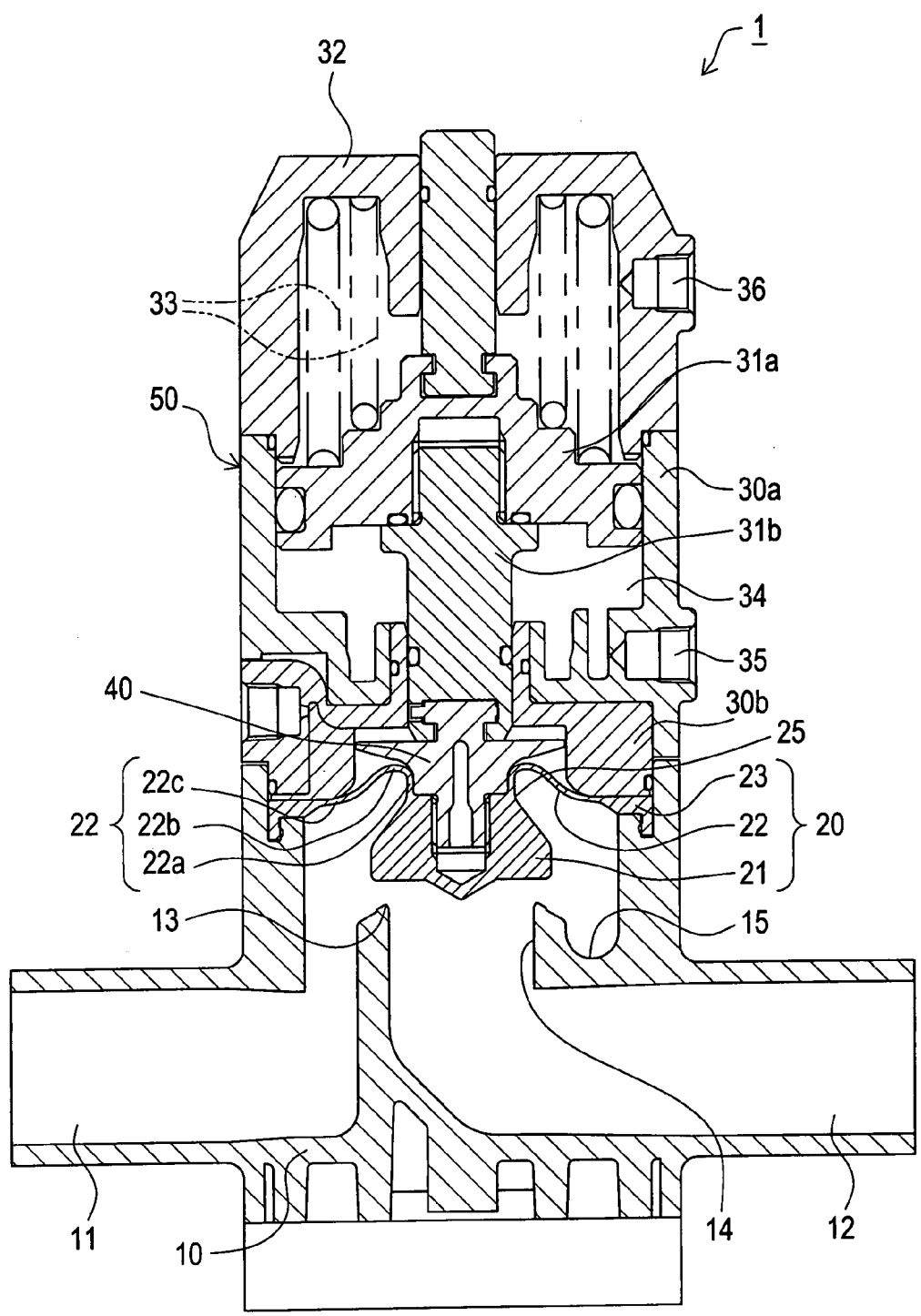
FIG. 2 is a sectional view of the diaphragm valve, showing a valve closed state.
Figure 3:
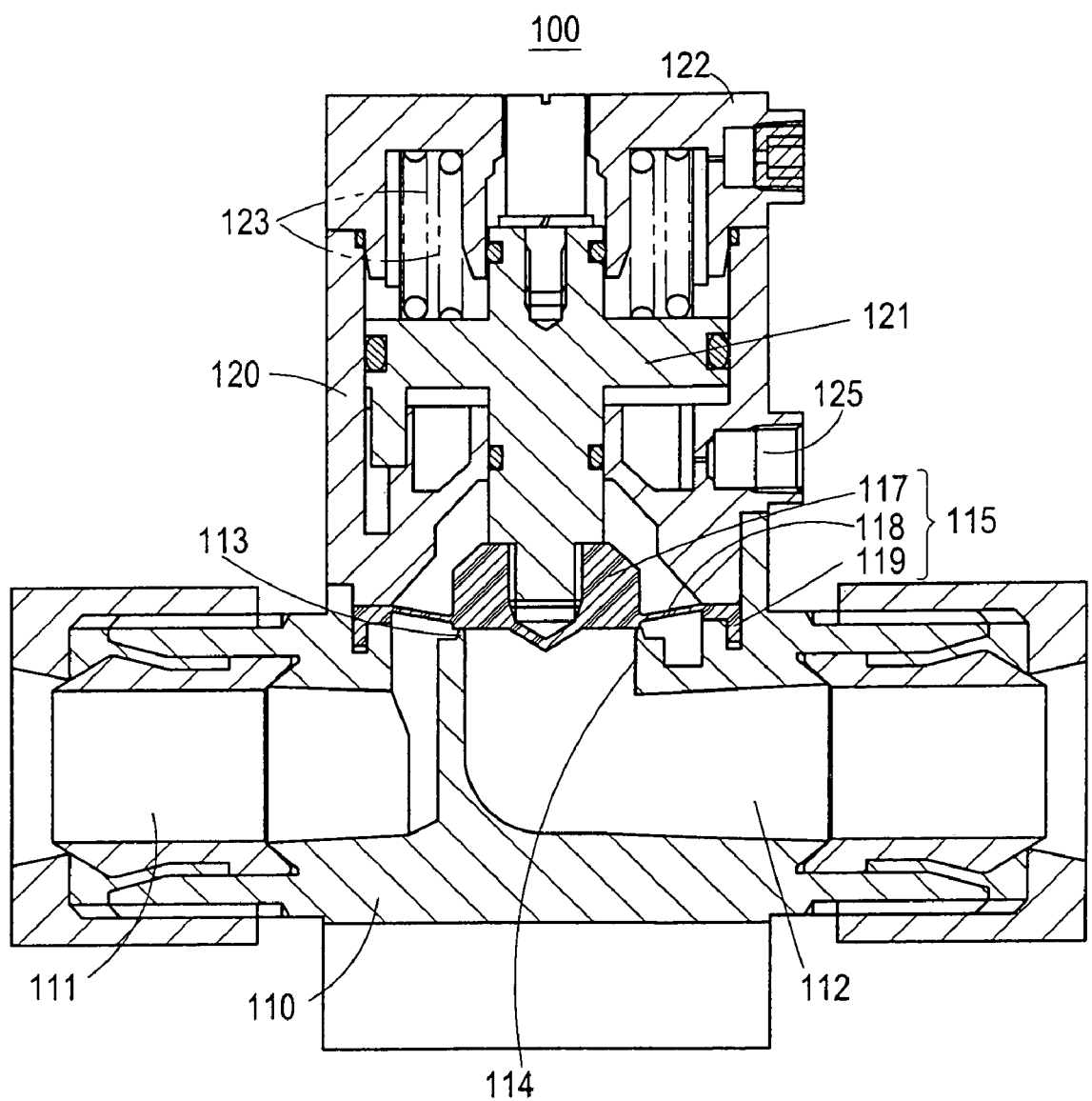
FIG. 3 is a sectional view of a conventional diaphragm valve.

A detailed description of a preferred embodiment of a diaphragm valve of the present invention will now be given referring to the accompanying drawings. In the present embodiment, the present invention is applied to a chemical liquid supply valve. A schematic configuration of the diaphragm valve of the present embodiment is shown in FIGS. 1 and 2. FIG. 1 is a sectional view of the diaphragm valve, showing a valve closed state. FIG. 2 is a sectional view of the diaphragm valve, showing a valve open state.

The diaphragm valve 1 includes a body 10 made of fluorocarbon resin, in which a first flow passage 11 and a second flow passage 12 are formed. A valve seat 13 is formed in the center of an upper part of the body 10. A valve port 14 in the valve seat 13 communicates with the second flow passage 12. An annular groove 15 formed around the valve seat 13 communicates with the first flow passage 11. Thus, both the first flow passage 11 and the second flow passage 12 communicate with an upper opening of the body 10. This opening is blocked by a diaphragm valve element 20. In particular, a peripheral edge of the diaphragm valve element 20 is fixed, forming an airtight space permitting communication between the first flow passage 11 and the second flow passage 12.

The diaphragm valve element 20 includes a valve element body 21 movable into and out of contact with the valve seat 13, a web (or diaphragm) portion 22 extending outward from the valve element body 21, and an annular fixed portion 23 formed at a peripheral edge of the web portion 22. The fixed portion 23 is firmly anchored between the body 10 and a second cylinder 30b mentioned later to hold the diaphragm valve element 20 in the body 10. Here, the body 10 is in contact with only a thick portion of the fixed portion 23, while the second cylinder 30b is in contact with part of the web portion 22 in addition to the fixed portion 23. With this configuration, a portion largely changing in area between the fixed portion 23 and the web portion 22 is supported in a direction that the web portion 22 is deformed. It should be noted that the diaphragm valve element 20 is made of fluorocarbon resin as with the body 10.

For controlling the supply of high-pressure fluid, the web portion 22 is designed to be about twice as thick as that of a conventional product. In the present embodiment, the thickness of the web portion 22 is 0.9 mm. However, if the shape of the conventional product remains unchanged and the web thickness is merely increased, the diaphragm valve element cannot be operated properly. In the diaphragm valve 1, therefore, a boundary (a root) 25 between the web portion 22 and the valve element body 21 is located near a center line (an axis of the rod 31b) L of the diaphragm valve element 20. In other words, a distance A between the center line L and the boundary 25 between the web portion 22 and the valve element body 21 is determined to be shorter than a distance B between the center line L and the valve seat 13 so that the boundary 25 between the web portion 22 and the valve element body 21 is located closer to the center line L than the position of the valve seat 13. Thus, the web portion 22 can have a longer length than the conventional one, so that the web portion 22 with increased thickness can be deformed smoothly.

Further, the web portion 22 includes a vertical portion 22a vertically formed continuous with the valve element body 21, a horizontal portion 22c horizontally formed continuous with the fixed portion 23, and a connecting portion 22b of a circular arc shape (an upward protruding shape) in section to connect the vertical portion 22a with the horizontal portion 22c. Specifically, the web portion 22 is designed to have a shape of cross section that is vertically continuous at the boundary (root) 25 with the upper surface of the valve element body 21 and extends upward therefrom and then sideways. The vertical portion 22a can therefore receive a force in an inward direction of the diaphragm valve element 20, so that the vertical portion 22a will not expand in an outward direction of the diaphragm valve element 20 and is constantly in contact with an outer surface of a backup 40 (part of the rod 31b serving as a driving shaft) mentioned later. In the valve closed state as shown in FIG. 1, the fixed portion 23 formed at the outer periphery of the web portion 22 is located higher than the boundary 25 between the web portion 22 and the valve element body 21.

Above the diaphragm valve element 20, an actuator 50 for controlling the operation of the diaphragm valve element 20 is placed; i.e., the actuator 50 is arranged on the body 10. The actuator 50 includes a first cylinder 30a, a second cylinder 30b, a piston 31a, a rod 31b, a cover 32, and a spring 33. The piston 31a is slidably arranged in the first cylinder 30a and the rod 31b is slidably arranged in the second cylinder 30b. Further, the piston 31a and the rod 31b are integrally coupled to each other.

The rod 31b is coupled, at its lower end, to the backup 40 which is integrally fitted in the valve element body 21 of the diaphragm valve element 20. Specifically, the rod 31b is coupled to the diaphragm valve element 20 through the backup 40. In this regard, the backup 40 is also a part of the rod 31b.

This backup 40 also serves to couple the rod 31b to the valve element body 21 and support the vertical portion 22a and the connecting portion 22b of the web portion 22 of the diaphragm valve element 20. This backup 40 is made of resin and arranged to be movable up and down together with the valve element body 21 of the diaphragm valve element 20. It should be noted that the backup 40 may be provided with a rubber member on a contact surface with the web portion 22.

The cover 32 is attached to the upper opening of the first cylinder 30a, forming a closed space in the first cylinder 30a in which the spring 33 is mounted. This spring 33 urges the piston 31a from above. Accordingly, this diaphragm valve 1 is a normally closed valve configured such that the urging force of the spring 33 acts on the piston 30a downward to place the valve element body 21 in contact with the valve seat 13 as shown in FIG. 1.

On the other hand, a pressure chamber 34 is formed under the piston 31a and an operation port 35 through which compressed air is to be supplied to the pressure chamber 34 is formed in the first cylinder 30a. The cover 32 is also formed with a breathing port 36 communicating with the space formed above the piston 31a on which the spring 33 is mounted.

Operations of the diaphragm valve 1 having the aforementioned configuration will be explained below. In the diaphragm valve 1, normally, the piston 31a is urged downward by the spring 33, pressing the valve element body 21 of the diaphragm valve element 20 coupled to the piston 31a through the rod 31b and the backup 40, against the valve seat 13 as shown in FIG. 1. In the diaphragm valve 1 in such a valve closed state, blocked by the diaphragm valve element 20, the fluid having entered in the first flow passage 11 is not permitted to flow into the second flow passage 12 or the fluid having entered in the second flow passage 12 is not permitted to flow into the first flow passage 11.

As compressed air is supplied through the operation port 35 of the actuator 50, the piston 31a is pressurized from below to move upward against the urging force of the spring 33. The valve element body 21 coupled to the piston 31a through the rod 31b and the backup 40 is therefore moved upward. Thus, the valve element body 21 is brought out of contact with the valve seat 13 into the valve open state where the first flow passage 11 and the second flow passage 12 communicate with each other as shown in FIG. 2. At this time, the fluid when supplied to the first flow passage 11 is permitted to flow into the second flow passage 12 via the groove 15 and the valve port 14 and, reversely, the fluid when supplied to the second flow passage 12 is permitted to flow into the first flow passage 11 via the valve port 14 and the groove 15.

Subsequently, when the compressed air supplied to the pressure chamber 34 is discharged through the operation port 35, the piston 31a urged by the spring 33 is moved downward. Accordingly, the valve element body 21 coupled to the piston 31a through the rod 31b and the backup 40 is moved downward. Thus, as shown in FIG. 1, the valve element body 21 is returned to come into contact with the valve seat 13 into the valve closed state, thereby blocking the flow of the fluid.

Here, in the diaphragm valve 1, the backup 40 integrally coupled to the valve element body 21 is movable up and down together with the diaphragm valve element 20. At valve-opening and valve-closing times, the vertical portion 22a of the web portion 22 of the diaphragm valve element 20 is constantly in contact with the outer surface of the backup 40 as shown in FIGS. 1 and 2. During the valve opening and closing operations, therefore, the web portion 22 can be bent by elastically deforming only the connecting portion 22b and hardly deforming the vertical portion 22a. Consequently, the vertical portion 22a is not deformed even when high-pressure fluid is supplied to the diaphragm valve 1. This makes it possible to prevent stress concentration on the boundary 25 between the vertical portion 22a and the valve element body 21. According to the diaphragm valve 1 as above, even when used for controlling the supply of the high-pressure fluid, it is possible to prevent stress concentration on or around the boundary 25 between the vertical portion 22a and the valve element body 21, so that the durability of the diaphragm valve element 20 can be improved. Accordingly, the diaphragm valve 1 can control the supply of the high-pressure fluid.

As explained in detail above, in the diaphragm valve 1 of the present embodiment, the horizontal portion 22c is formed at the outer edge of the web portion 22 and hence the vertical portion 22a receives a force in the inward direction of the diaphragm valve element 20. Thus, the vertical portion 22a can remain constantly contact with the outer surface of the backup 40 and will not expand in the outward direction of the diaphragm valve element 20. In this diaphragm valve 1, accordingly, even when the high-pressure fluid is supplied thereto, the vertical portion 22a is supported by the backup 40 without being deformed. This makes it possible to prevent stress from concentrating on the boundary 25 between the vertical portion 22a and the valve element body 21, thereby preventing further deterioration. According to the diaphragm valve 1, therefore, even when used for controlling the supply of the high-pressure fluid, it is possible to prevent stress concentration on or around the boundary 25 between the vertical portion 22a and the valve element body 21, and the durability of the diaphragm valve element 20 can be improved.

The aforementioned embodiment is merely an exemplification, which does not apply any limitation to the present invention. The present invention may be embodied in other specific forms without departing from the spirit or essential characteristics thereof. For instance, in the aforementioned embodiment, an air cylinder is adopted as the actuator for causing the valve opening operation of the diaphragm valve element 20 against the urging force of the spring 33. As an alternative to this, a solenoid may be utilized.

The invention claimed is:

1. A diaphragm valve comprising:
a valve seat being formed at a boundary between a first flow passage and a second flow passage which are formed in a body;
a diaphragm being coupled to a driving shaft of an actuator to be brought into/out of contact with the valve seat to close/open between the first flow passage and the second flow passage, wherein
the diaphragm includes a valve element body movable into contact with the valve seat, a web portion extending outward from the valve element body, and a fixed portion formed at a peripheral edge of the web portion,
the web portion includes a vertical portion vertically formed continuous with the valve element body, a curved portion connected to a top end of the vertical portion, and a connecting portion that connects the curved portion with the fixed portion,
the web portion having a portion out of contact with the valve element body and a backup both in a valve-opened state and a valve-closed state,
the curved portion being less in contact with the driving shaft in a valve-opened state as opposed to a valve-closed state,
the vertical portion being of substantially a same length in both the valve-opened state and the valve-closed state, and
substantially all of the vertical portion being in contact with the driving shaft in both the valve-opened state and the valve-closed state.

2. A diaphragm valve comprising:
a valve seat being formed at a boundary between a first flow passage and a second flow passage which are formed in a body;
a diaphragm being coupled to a driving shaft of an actuator to be brought into/out of contact with the valve seat to close/open between the first flow passage and the second flow passage, wherein
the diaphragm includes a valve element body movable into contact with the valve seat, a web portion extending outward from the valve element body, and a fixed portion formed at a peripheral edge of the web portion, and the web portion includes a vertical portion vertically formed continuous with the valve element body, a horizontal portion horizontally formed continuous with the fixed portion, and a connecting portion of an arcuate shape to connect the vertical portion with the fixed portion, the web portion having a portion out of contact with the valve element body and a backup both in a valve-opened state and a valve-closed state, the connecting portion of the arcuate shape being less in contact with the driving shaft in a valve-opened state as opposed to a valve-closed state, the vertical portion being of substantially a same length in both the valve-opened state and the valve-closed state, and substantially all of the vertical portion being in contact with the driving shaft in both the valve-opened state and the valve-closed state.

3. The diaphragm valve set forth in claim 1, wherein the diaphragm is configured such that the boundary between the valve element body and the web portion is located within a diameter of the valve seat.

4. The diaphragm valve set forth in claim 1, wherein the driving shaft is provided at its end with the backup coupled with the diaphragm so as to be in contact with the vertical portion and the connecting portion to support the web portion.

5. The diaphragm valve set forth in claim 3, wherein the driving shaft is provided at its end with a backup coupled with the diaphragm so as to be in contact with the vertical portion and the connecting portion to support the web portion.

6. The diaphragm valve set forth in claim 2, wherein the diaphragm is configured such that the boundary between the valve element body and the web portion is located within a diameter of the valve seat.

7. The diaphragm valve set forth in claim 2, wherein the driving shaft is provided at its end with the backup coupled with the diaphragm so as to be in contact with the vertical portion and the connecting portion to support the web portion.

8. The diaphragm valve set forth in claim 6, wherein the driving shaft is provided at its end with the backup coupled with the diaphragm so as to be in contact with the vertical portion and the connecting portion to support the web portion.

9. The diaphragm valve set forth in claim 1, wherein the thickness of the web portion is at least 0.9 mm.

* * * * *

UNITED STATES PATENT AND TRADEMARK OFFICE
CERTIFICATE OF CORRECTION

PATENT NO. : 7,628,376 B2
APPLICATION NO. : 11/665975
DATED : December 8, 2009
INVENTOR(S) : Akinori Masamura et al.

It is certified that error appears in the above-identified patent and that said Letters Patent is hereby corrected as shown below:

Title page, column 1, Assignee section (73), delete "CDK Corporation, Komaki (JP)" and insert --CKD Corporation, Komaki (JP)--

Column 3, line 23, delete "This diaphragm valve can to reliably prevent the vertical" and insert --This diaphragm valve can reliably prevent the vertical--

Column 4, line 1, delete "This diaphragm valve can to reliably prevent the vertical" and insert --This diaphragm valve can reliably prevent the vertical--

Signed and Sealed this

Twenty-fourth Day of August, 2010

David J. Kappos
*Director of the United States Patent and Trademark Office*